US012179868B2

(12) United States Patent
Weiershausen et al.

(10) Patent No.: US 12,179,868 B2
(45) Date of Patent: Dec. 31, 2024

(54) FRAME LOCK

(71) Applicant: ABUS August Bremicker Söhne KG, Wetter-Volmarstein (DE)

(72) Inventors: Bernd Weiershausen, Rehe (DE); Thomas Müller, Bischoffen (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 239 days.

(21) Appl. No.: 17/888,545

(22) Filed: Aug. 16, 2022

(65) Prior Publication Data
US 2023/0072909 A1 Mar. 9, 2023

(30) Foreign Application Priority Data
Sep. 3, 2021 (DE) .......................... 102021122850.6

(51) Int. Cl.
*B62H 5/14* (2006.01)
(52) U.S. Cl.
CPC ...................... *B62H 5/14* (2013.01)
(58) Field of Classification Search
CPC .......... E05B 71/00; E05B 67/28; E05B 67/32; B62H 5/14; B62H 5/142; B62H 5/147
See application file for complete search history.

(56) References Cited

U.S. PATENT DOCUMENTS

2019/0023337 A1\* 1/2019 Gilomme ................ E05B 71/00

FOREIGN PATENT DOCUMENTS

| DE | 1842230 U | 11/1961 | |
|---|---|---|---|
| DE | 10309599 A1 | 9/2004 | |
| EP | 1459965 A2 \* | 9/2004 | ............. B62H 5/147 |
| EP | 1712458 A1 \* | 10/2006 | ............. B62H 5/147 |
| EP | 1182123 A2 | 2/2022 | |
| GB | 2239635 A \* | 7/1991 | ............. B62H 5/142 |
| WO | WO-2010043848 A1 \* | 4/2010 | ............. B62H 5/142 |

OTHER PUBLICATIONS

Machine Translation for EP 1712458 A1 (Year: 2006).\*

\* cited by examiner

*Primary Examiner* — Christine M Mills
*Assistant Examiner* — Christopher F Callahan
(74) *Attorney, Agent, or Firm* — Dickinson Wright PLLC

(57) ABSTRACT

A frame lock for a two-wheeler comprises a housing; a locking apparatus that is received in the housing; and a closing hoop that is movably supported at the housing between an open position and a closed position and that can be blocked in the closed position by means of the locking apparatus. The frame lock in this respect has two fastening sections having at least one respective hole and is configured to be fastened to the two-wheeler by screwing screws in a screw-in direction through the holes into threaded bushings provided at the two-wheeler. Each of the two fastening sections is configured as a fastening piece which is formed separately from the housing, in which the respective hole is formed, and which is displaceably supported at the housing linearly guided along a displacement direction.

18 Claims, 3 Drawing Sheets

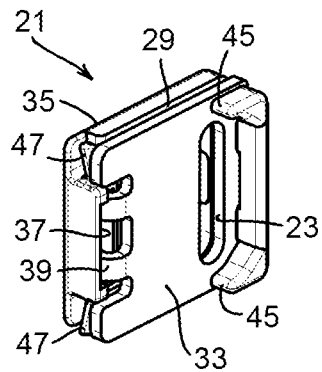
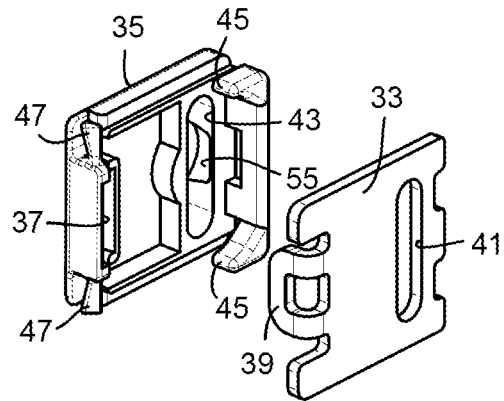
Fig. 5     Fig. 6
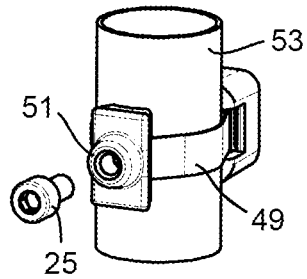
Fig. 7
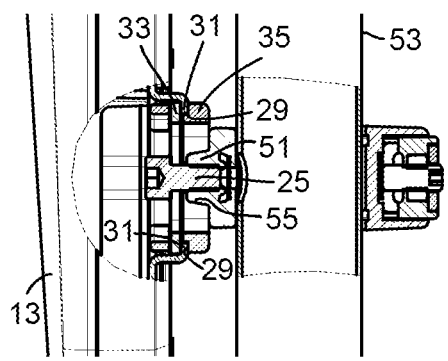
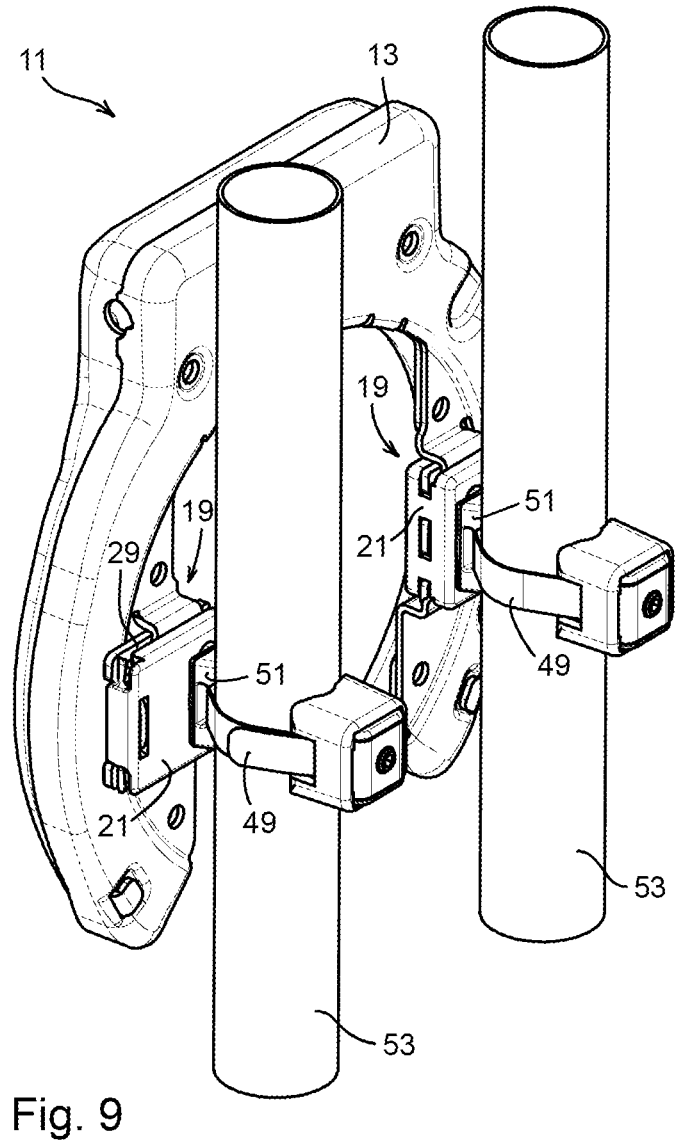
Fig. 8     Fig. 9

FRAME LOCK

CROSS-REFERENCE TO RELATED APPLICATIONS

This application claims the benefit and priority of German Patent Application No. DE 102021122850.6, filed on Sep. 3, 2021. The entire disclosure of the above application is incorporated herein by reference.

FIELD OF THE INVENTION

The invention relates to a frame lock for a two-wheeler.

BACKGROUND OF THE INVENTION

Frame locks typically differ from portable two-wheeler locks in that they are fixedly and usually permanently connected to the frame of the two-wheeler, for example screwed to stays of a frame of the two-wheeler. In this respect, the frame lock is arranged such that a closing hoop of the frame lock may be selectively adjusted from an open position, in which it does not block the wheels of the two-wheeler against rotation, into a closed position, in which it engages between the spokes of one of the wheels to prevent travel with the two-wheeler in this manner. In this closed position, the closing hoop may be expediently blocked, i.e. secured against leaving the closed position, by means of a locking apparatus of the frame lock, wherein a user has to have a secret code, such as a key, for an unlocking actuation of the locking apparatus. Typical designs for the closing hoop are, on the one hand, a configuration as a pivot hoop having a straight course and, on the other hand, a configuration as a rotary hoop having an arcuate course.

So that the closing hoop of the frame lock may reliably block the respective wheel of the two-wheeler in its closed position, but is securely arranged outside the movement path of the wheel in its open position, and so that the closing hoop may also be adjusted unimpeded between these positions, the frame lock has to be fastened to the two-wheeler in a suitable position for this purpose. It is in particular common to fasten a frame lock to the two back end stays of the two-wheeler, i.e. to the two stays of the back end of the two-wheeler that connect the seat tube to the hub of the rear wheel at opposite sides of the rear wheel of the two-wheeler. For the fastening of accessories, threaded bushings, to which the frame lock may be tightly screwed, are often provided at the back end stays. However, due to the large number of different types of two-wheelers and the general trend towards greater individualization, two-wheelers may have very different frame geometries such that the positions of the threaded bushings may vary greatly relative to one another as well as to the respective wheel. Furthermore, it may also happen that a two-wheeler has no threaded bushings or none suitable for fastening the respective frame lock.

SUMMARY OF THE INVENTION

It is an object to provide a frame lock for a two-wheeler whose fastening to the two-wheeler is simple and particularly flexible in that said frame lock may be adapted to a large number of different frame geometries, and to provide a method for a simple and flexible fastening of the frame lock to a two-wheeler.

The object is satisfied by a frame lock having the features of claim 1 and by a method of fastening such a frame lock.

The frame lock in accordance with the invention for a two-wheeler comprises a housing; a locking apparatus that is received in the housing; and a closing hoop that is movably supported at the housing between an open position and a closed position and that may be blocked in the closed position by means of the locking apparatus. The closing hoop may, for example, be configured as a pivot hoop or as a rotary hoop.

In accordance with the typical function of a frame lock, the frame lock may in particular be configured to be arranged at the two-wheeler such that the closing hoop blocks a wheel of the two-wheeler against rotation in its closed position, whereas it releases said wheel for a rotation in its open position. In this respect, the closing hoop is indeed generally movable between the closed position and the open position, namely for example adjustable by hand. However, this general movability may be canceled by the locking apparatus that may block the closing hoop in the closed position. For this purpose, the locking apparatus may be adjustable between a blocking state, in which it blocks the closing hoop in its closed position, and a release state in which it releases the closing hoop for a movement between its closed position and its open position. In this respect, an adjustment of the locking apparatus from the blocking state into the release state preferably requires having a secret code. In this way, it may be ensured that only an authorized person may unlock the closing hoop and may thus open the frame lock.

The locking apparatus may, for example, comprise a latch that may cooperate with the closing hoop in a blocking manner. Furthermore, the locking apparatus may comprise a lock cylinder via which the latch may be actuated, wherein the secret code may then be present in the form of a key associated with the lock cylinder. The latch may also be adjustable by a motor, which may enable a remote actuation. For this purpose, the locking apparatus may comprise a motor and, if necessary, communication means.

The type of movability of the closing hoop is in particular defined by its support at the housing. For example, the closing hoop may be pivotably supported at the housing. Alternatively thereto, the closing hoop may be at least partly received in a hoop receiver of the housing and may be displaceable therein guided by the hoop receiver along its course. In general, this may be a linear displaceability along a straight path. The closing hoop is preferably a rotary hoop that extends along a circular path and that is displaceable along this circular path between its open position and its closed position. Such a displacement of the rotary hoop along the circular path is not linear since it is not a pure translation, but rather corresponds to a rotation about an axis of rotation that extends perpendicular to the plane of the circular path through the center of the circular path.

Fora fastening to the two-wheeler, the frame lock has two fastening sections having at least one respective hole. At least one such a hole is therefore formed in each of the two fastening sections. The frame lock is in this respect configured to be fastened to the two-wheeler by screwing screws in a screw-in direction through the holes into threaded bushings that are provided at the two-wheeler, in particular at back end stays of the two-wheeler. In other words, the fastening sections and in particular their respective holes are formed and arranged at the frame lock such that such a fastening is possible by means of screws screwed through the holes into the threaded bushings. For this purpose, the fastening sections may in particular be arranged at a rear side of the frame lock or of its housing, said rear side being configured to contact the back end stays of the two-wheeler.

The holes formed in the fastening sections are in particular shaped and oriented within the respective fastening section such that a respective screw may extend through them in said screw-in direction. For example, an entry cross-section and an exit cross-section of the respective hole, which the respective hole has at its opposite ends, may be perpendicular to the screw-in direction. In this respect, the holes preferably extend continuously through the respective fastening section such that a screwed-in screw may contact the hole at the one side thereof with its head and may project out of said hole at the opposite side thereof with its shaft. The screw may in particular be a screw having an ISO metric thread of size M 5. The holes of the fastening sections then expediently have corresponding dimensions.

The number of fastening sections (and thus also the number of holes provided for the fastening of the frame lock by means of screws) is not limited to two in this respect. However, the frame lock preferably has exactly two fastening sections of said type, in each of which exactly one hole is formed for receiving a respective screw since the complexity of the fastening is thereby reduced. A screw may then be screwed through the hole of the one of the two fastening sections into a threaded bushing that is provided at the one side of the respective wheel of the two-wheeler, in particular at one of two back end stays of the two-wheeler, and a screw may be screwed through the hole of the other fastening section into a threaded bushing that is provided at the other side of the respective wheel, in particular at the other one of the two back end stays.

The threaded bushings may, for example, each be configured as a base having an internal thread, wherein the base may be welded or soldered to the two-wheeler, in particular to a respective back end stay of the two-wheeler. The threaded bushings may generally also be configured as retrofittable, for example as screw-on bases that are initially independent of the two-wheeler and attachable to the two-wheeler, that have internal threads, and that may be fastened to the two-wheeler by fastening means in the desired position. Such retrofittable threaded bushings may be provided as accessories to the frame lock. In general, the threaded bushings are, however, not an integral part of the frame lock and are in particular not provided at its housing or at its fastening pieces.

In accordance with the invention, each of the two fastening sections is configured as a fastening piece which is formed separately from the housing, in which the respective hole is formed, and which is displaceably supported at the housing linearly guided along a displacement direction. Since the two fastening sections are therefore each configured as such a fastening piece, the frame lock comprises at least two such fastening pieces, in particular exactly two such fastening pieces. In this respect, fastening pieces are preferably of the same construction as one another, whereby their manufacture is simplified.

The fact that the two fastening pieces are formed separately from the housing does not mean that they would not have a connection to the housing or would be spaced apart from the housing, but rather that they are formed as components that are generally independent of the housing, that may in particular be manufactured separately from the housing, and that may also have a different material than the housing. In fact, the two fastening pieces are connected to the housing, namely movably supported at the housing. This movability is a displaceability along a displacement direction. In other words, the respective fastening piece may be displaced relative to the housing both in the displacement direction and just opposite thereto in the opposite direction.

The displacement direction may be identical for both fastening pieces in this respect. However, this is not necessarily the case; each of the two fastening pieces may rather be displaceably supported at the housing along a respective displacement direction, wherein the displacement directions of the two fastening pieces may differ. In both cases, it may be advantageous if the (respective) displacement direction is perpendicular to the screw-in direction in which, in order to fasten the frame lock to the two-wheeler, screws may be screwed through the hole of the respective fastening piece into threaded bushings provided at the two-wheeler. In general, it may, however, also be considered that the (respective) displacement direction differs from an orientation perpendicular to the screw-in direction, for example, by an angle of at most 15°, preferably of at most 10°, in particular of at most 5°. In this respect, it may be advantageous if both displacement directions differ by the same angle in terms of magnitude, but in opposite directions from an orientation perpendicular to the screw-in direction. The two displacement directions may in particular be oriented mirror-symmetrically to one another with respect to the screw-in direction or a plane in parallel with the screw-in direction.

The displaceability of the fastening pieces is linear in particular in that each of the fastening pieces may be displaced in a straight line along the respective displacement direction. In this respect, the respective fastening piece is guided along the respective displacement direction, in particular by the type of its support at the housing. This may in particular comprise the respective fastening piece only being able to be displaced at all along the respective displacement direction within the framework of its displaceability and in this respect not being movable in any other direction or manner relative to the housing (apart from any clearance that may be present). Provision may in particular be made that the respective fastening piece is neither rotatable nor pivotable relative to the housing. Overall, the movability of the fastening piece resulting from the support of the respective fastening piece at the housing preferably only has exactly one degree of freedom.

So that the fastening pieces may serve as fastening sections for fastening the frame lock to the two-wheeler, they are preferably supported at an outer side of the housing. In this respect, the fastening pieces may in particular be arranged and displaceable completely outside the housing.

Furthermore, it is preferred for the two fastening pieces to be at least substantially rigid. As rigid components, they are in particular not configured to be deformed for the fastening to the two-wheeler; rather, each of the fastening pieces is configured to maintain its shape in which it is linearly displaceably supported at the housing both on and after the fastening to the two-wheeler.

Whereas fastening sections for fastening the respective frame lock to the two-wheeler are usually formed as an integral part of the housing in the case of conventional frame locks, with the holes formed in the fastening sections, for example, being formed in a rear wall of the housing or in flange sections of the housing, in the frame lock in accordance with the invention, the fastening sections are formed separately from the housing and are furthermore displaceably supported guided relative to the housing. In this way, it is achieved that the position of the fastening sections, in particular of the holes formed therein, may be adapted to the frame geometry of the respective two-wheeler such that the frame lock in accordance with the invention may be fastened in a particularly flexible manner to two-wheelers having different frame geometries.

In accordance with an advantageous embodiment, the displacement directions of both fastening pieces are at least substantially in parallel with one another. Effectively, in such an embodiment, both fastening pieces are therefore displaceably supported at the housing guided along the same displacement direction common to both fastening pieces. The two fastening pieces may thereby be displaced relative to one another towards one another or away from one another along the common displacement direction such that the spacing of the holes formed in the two fastening pieces from one another may be flexibly adapted. Furthermore, the two fastening pieces may be displaced together in the same direction relative to the housing. Therefore, the frame lock as a whole (apart from the fastening pieces) may also be displaced relative to both fastening pieces, which also enables a subsequent adaptation of the position of the frame lock relative to the threaded bushings after a screwing of screws through the holes of the fastening pieces into the threaded bushings. In general, however, it may also be considered that the two displacement directions are oriented obliquely to one another. For example, they may include an angle of at most 30°, preferably of at most 20°, in particular of at most 10°, between them. The plane which is in this respect spanned by the two displacement directions is preferably in parallel with the screw-in direction.

In accordance with a further advantageous embodiment, the respective hole is formed as an elongate hole whose longitudinal extent is transverse, in particular perpendicular, to the displacement direction of the respective fastening piece. The elongate hole may in particular have a straight course and, with respect to the direction of this course, may be oriented transversely, in particular perpendicular, to the displacement direction of the respective fastening piece. The longitudinal extent of the elongate hole is preferably also transverse, in particular perpendicular, to said screw-in direction. If a fastening piece has more than one hole that may be used to fasten the frame lock to the two-wheeler, each of these holes is preferably formed as an elongate hole and is oriented transversely, in particular perpendicular, to the displacement direction of the respective fastening piece. The plurality of elongate holes of a respective fastening piece may in particular then be aligned in parallel with one another.

Due to the combination of the linear displaceability of the fastening pieces with elongate holes that are formed in the fastening pieces and that are oriented transversely to this displaceability, the flexible adaptability of the frame lock to different frame geometries of different two-wheelers is also substantially improved. For since the screws may be displaced within the elongate holes along the longitudinal extent of the respective elongate hole and the fastening pieces in which the elongate holes are formed may furthermore be displaced transversely to said longitudinal extent, not only may the spacing of the elongate holes be adapted to the spacing of the threaded bushings, but the housing of the frame lock may also, after screws have been screwed through the elongate holes into the threaded bushings, be displaced in the manner of a cross-slide both along the displacement direction of the fastening pieces and transversely thereto along the longitudinal extent of the elongate holes relative to the threaded bushings into a suitable position (at least as long as the screws have not yet been tightened). This in particular applies if the fastening pieces may be displaced in parallel with one another, wherein the elongate holes formed in the two fastening pieces are then in turn preferably likewise aligned in parallel with one another.

Furthermore, it is preferred for the fastening pieces to be captively supported at the housing such that, even if the frame lock is not yet fastened to the two-wheeler, they may not automatically detach from the housing (e.g. due to gravity). Within the path along which they are displaceably supported at the housing guided relative to the housing, they may be held at the housing just by this guidance. To prevent the fastening pieces from being able to detach from the housing at the ends of their guided displaceability, means may be provided that block the fastening pieces against being moved beyond these ends.

Accordingly, in accordance with a further advantageous embodiment, abutments may be formed at the housing and/or at the fastening pieces, said abutments limiting the displaceability of the fastening pieces to a defined path along the displacement direction of the respective fastening piece. Thus, within the path, the fastening pieces may generally be displaced freely guided along the respective displacement direction, but, at the ends of the path, they may abut an abutment formed at the respective fastening piece and/or an abutment formed at the housing such that they may not be moved beyond the defined path and may also not (at least not automatically) detach from the housing.

In this respect, provision may be made that at least one respective abutment may be elastically urged back, for example, to be able to assemble the respective fastening piece at the housing, in particular to insert it into the support at the housing, and/or to be able to detach it from the housing, for example for a replacement. On the assembly of the fastening piece at the housing, the respective abutment may elastically return from its urged-back position into its normal position after the attachment of the fastening piece to the housing. In this way, the fastening piece may snap into its displaceable support at the housing.

In accordance with a further advantageous embodiment, each of the fastening pieces is configured as an areal fastening plate aligned in parallel with a fastening plane, wherein the displacement direction of the respective fastening piece is in parallel with the fastening plane. In general, if the fastening pieces are configured as fastening plates, one fastening plate may be aligned in parallel with another respective fastening plane and may be displaceable as another one. However, it is preferably in each case the same fastening plane such that the fastening plates are aligned and displaceable in parallel with a common fastening plane.

The fastening plates are in particular areal in that they each have two side surfaces that are perpendicular to a normal direction and opposite with respect to the normal direction and whose spacing along the normal direction from one another is substantially smaller than their respective extent in two spatial directions perpendicular to one another and to the normal direction. This spacing in particular amounts to at most 50%, preferably at most 40%, of the smallest extent of a respective one of the side surfaces in a spatial direction perpendicular to the normal direction. The fact that a respective fastening plate is in parallel with a plane here in particular means that the direction of the smallest extent of the respective fastening plate (that may correspond to said normal direction) is perpendicular to this plane. One of said two side surfaces of the respective fastening plate perpendicular to the normal direction may in this respect be disposed in the fastening plane. Both such a side surface of the one fastening plate and such a side surface of the other fastening plate may in particular be disposed in a common fastening plane.

For a frame lock, it is expedient if the housing has a C shape or U shape such that the frame lock may be arranged at the two-wheeler such that the housing of the frame lock may engage around the tire and the rim of a wheel of the two-wheeler with the limbs of the C shape or U shape and the closing hoop of the frame lock may extend in its closed position between the spokes of the wheel from the one limb to the other in order to block the wheel against rotation in this manner. The C shape or U shape of the housing may in this respect be at least substantially mirror-symmetrical with respect to a center plane that extends between the two limbs of the C shape or U shape. This center plane may in particular be in parallel with the screw-in direction in which, in order to fasten the frame lock to the two-wheeler, screws may be screwed through the holes of the fastening sections into threaded bushings provided at the two-wheeler. In this respect, said mirror symmetry does not imply that the housing as a whole has to be exactly mirror-symmetrical, but rather refers to the idealized C shape or U shape to which the housing may be reduced in a simplified view.

In accordance with an advantageous embodiment, the paths along which the two fastening pieces are displaceable are mirror-symmetrical to one another with respect to said center plane. In this respect, the displacement directions of both fastening pieces may in particular be perpendicular to this center plane (and thus also in parallel with one another). If the holes formed in the fastening pieces are each formed as elongate holes, their respective longitudinal extent is furthermore preferably in parallel with said center plane. Due to such symmetries and orientations, the frame lock may be equally flexibly positionable in both directions perpendicular to the center plane.

In accordance with a further advantageous embodiment, each of the fastening pieces is formed at least in two parts and comprises a first fastening part and a second fastening part that are fixedly connected to one another, wherein the first fastening part has a hole and the second fastening part has a hole and the holes of the two fastening parts are arranged overlapping with respect to the screw-in direction such that they jointly form the at least one hole of the respective fastening piece. The respective fastening piece is in this respect formed in two parts in that the first fastening part and the second fastening part are two parts that are manufactured separately from one another and that together form the fastening piece, wherein it is not generally precluded that the fastening piece comprises even further parts.

The first fastening part may be a front part in the screw-in direction and the second fastening part may be a rear part in the screw-in direction such that the second fastening part is arranged further in the screw-in direction than the first fastening part. The first fastening part in this respect preferably comprises a metal as the material and may in particular be configured as a sheet metal plate, for example a punched sheet metal plate. The second fastening part may, for example, comprise a plastic as the material and may in particular be configured as an injection-molded part.

The fact that the two fastening parts are fixedly connected to one another in particular means that they are permanently connected to one another, i.e. that provision is not made during a typical use of the frame lock that they are released from one another. Furthermore, the fastening parts are preferably connected to one another such that they are not movable relative to one another at least along the displacement direction. Furthermore, it is preferred for the first fastening part and the second fastening part to be connected to one another in a form-fitting manner. They may in particular be clipped to one another such that the one snaps in at the other in a form-fitting manner on the connection of the two fastening parts.

The at least one hole formed in the respective fastening piece in this respect extends through the two fastening parts of the respective fastening piece such that both fastening parts themselves each have a hole and the hole of the fastening piece results from the overlap of the two holes formed in a respective one of the two fastening parts. The holes in this respect overlap with respect to the screw-in direction in that they are disposed behind one another along the screw-in direction such that, when viewed along the screw-in direction, the one hole covers the other. The continuous hole of the fastening piece in this respect has the shape of the intersection set of the shapes of the holes of the fastening parts from which the fastening piece is formed. In this respect, the holes of the fastening parts are preferably at least substantially congruent. They may in particular each be formed as an elongate hole and have the same length (extent along the longitudinal extent) and width (extent perpendicular to the longitudinal extent). In this respect, the holes of the two fastening parts do not necessarily have to directly contact one another along the screw-in direction, but may also be arranged at a certain spacing from one another.

The fastening pieces may be displaceably supported at the housing linearly guided along their respective displacement direction in that grooves are formed at the fastening pieces or at the housing, into which grooves webs provided at the respective other component engage. In this respect, the grooves and the webs preferably have a straight course and are aligned in parallel with the displacement direction with respect to their respective course.

In accordance with a further advantageous embodiment, each of the fastening pieces has one or more grooves aligned in parallel with the displacement direction, wherein a respective web formed at the housing engages into each of the grooves. The alignment of the grooves in parallel with the displacement direction in this respect refers to their respective course. The webs engaging into the grooves are correspondingly oriented to enable the displaceability of the respective fastening piece relative to the housing. The webs may, for example, be configured as sheet metal edges that project from an outer side of the housing.

Each of the fastening pieces preferably has two grooves arranged opposite one another, in particular with respect to a direction perpendicular to the displacement direction. The grooves may, for example, be provided at two mutually opposite margins of the respective fastening part, in particular at opposite marginal sides of a respective fastening part configured as an areal fastening plate. In this respect, the grooves are in particular arranged opposite one another in that they extend into the fastening piece from opposite directions, in particular towards one another, and accordingly face with the open side of their respective cross-section in opposite directions, in particular away from one another.

In this respect, the webs that are formed at the housing and that engage into the grooves of a respective fastening piece may in particular be arranged such that they engage into a respective one of the grooves from opposite directions towards one another. In this respect, the respective fastening piece may therefore be arranged between the webs. The respective fastening piece may in particular be inserted between the webs formed at the housing for the assembly at the housing.

In this respect, the grooves may each generally be open at at least one of their ends or also at both ends in order to enable said insertion. However, provision may also be made that one or more of the grooves, in particular all of the grooves, are closed at at least one of their ends by a blocking section such that the web engaging into the respective groove may not leave the groove at this end. In this regard, the blocking section may act as an abutment, as it was described further above, and, as such, may limit the displaceability of the respective fastening piece in at least one direction. In this respect, the blocking section may be able to be elastically urged back so that the respective web may be guided past the blocking section for the assembly or for a replacement of the respective fastening piece.

If the fastening pieces are formed in two parts as explained, it is advantageous if one or more of the grooves are formed between the two fastening parts of the respective fastening piece. The groove may then be bounded transversely to its course at the one side by the one fastening part and at the other side by the other fastening part. The base of the groove may be partly formed by the one fastening part and partly by the other fastening part, or also by only one of the two fastening parts. The base of the groove may generally also be at least partly open.

In such an embodiment, in which one or more grooves are formed between the two fastening parts of the respective fastening piece, it is further advantageous if the fastening parts of the respective fastening piece, at least as long as the frame lock is not yet fastened to the two-wheeler, have a clearance with respect to one another in the screw-in direction, i.e. are movable relative to one another at least to a certain extent in the screw-in direction, and are configured, when the frame lock is fastened to the two-wheeler, to be clamped against one another along the screw-in direction by the screw screwed in through the hole of the fastening piece such that at least one of the webs of the housing engaging into a respective groove of the fastening piece is clamped in the respective groove. In this way, due to the tightening of the screw, a friction-locked fixing of the position of the fastening piece adopted during the tightening may be achieved along the displacement direction of said fastening piece. As long as the screw is, in contrast, only screwed in, but not yet tightened, the fastening piece may still be displaced relative to the housing and the housing may thus still be flexibly positioned relative to the threaded bushings provided at the two-wheeler.

In accordance with a further advantageous embodiment, in each of the fastening pieces in its side facing in the screw-in direction, a receiver for receiving a screw-on base having an internal thread is formed, said receiver regionally widening the hole of the respective fastening piece at one side. At two-wheelers that do not have threaded bushings at suitable positions, such screw-on bases having internal threads may replace said threaded bushings and may be subsequently attachable to a respective two-wheeler for this purpose. The frame lock may then be configured to be fastened to the two-wheeler by screwing screws in the screw-in direction through the holes into the screw-on bases that are attached to the two-wheeler and that have internal threads. For this purpose, the receiver may in particular be formed in the region of the hole of the respective fastening piece.

Since the screw-on bases (unlike threaded bushings permanently formed at the two-wheeler) are not fixed to a precisely defined position at the two-wheeler, it may be expedient to instead unambiguously define their arrangement relative to a respective fastening piece of the frame lock. For this purpose, said receiver may be formed complementary to the shape of the screw-on base such that the screw-on base may be received transversely to the screw-in direction at least substantially without a clearance in the receiver.

While the hole does not have to be substantially wider than the diameter of the internal thread of the screw-on base to be able to receive the screw, the receiver has to be able to receive the screw-on base, which is wider in comparison with the internal thread, and is therefore at least regionally widened with respect to the hole. If the hole is formed as an elongate hole, the receiver may in particular serve to fix the screw-on base to a specific position along the longitudinal extent of the elongate hole. For this purpose, the elongate hole is preferably not widened by the receiver along its total longitudinal extent, but only in a region of the longitudinal extent corresponding to the position, for example in a central region.

To be able to receive the screw-on base, it is sufficient if the receiver is formed at the side of the respective fastening piece facing in the screw-in direction and the hole of the fastening piece is therefore only widened at one side, i.e. only at said side and in particular not continuously, especially as there would be a risk with a continuous widening that the screw could pass through the hole together with its head and thus could not fasten the fastening piece to the screw-on base.

The screw-on bases may be independent of the frame lock. However, it is expedient for a user of the frame lock if the screw-on bases are included with the frame lock. Therefore, in the above embodiment, it is further advantageous if the frame lock comprises two band clamps that are configured for fastening to a respective stay, in particular a back end stay, of the two-wheeler, wherein each of the band clamps has a screw-on base which is arranged at the respective band clamp, which has an internal thread, and which has a shape complementary to the receivers formed in the fastening pieces.

The screw-on bases may be fastened to the two-wheeler by means of the band clamps. In this respect, the screw-on bases are preferably displaceably arranged at the respective band clamp. After the fastening of the screw-on bases to the two-wheeler, the frame lock with the fastening pieces may be placed onto the screw-on bases such that the latter engage into the receivers formed in the fastening pieces. In this respect, the mutually complementary shapes of the screw-on bases and of the receivers advantageously provide an exact fit. The screw-on base may, for example, have the shape of a conical dome that facilitates an introduction of the screw-on base into the receiver formed complementary thereto.

The method in accordance with the invention of fastening a frame lock in accordance with the invention (that may in particular be configured in one of the ways described above) to a two-wheeler comprises the following steps: displacing the fastening pieces relative to one another until the spacing of the holes formed in the fastening pieces corresponds to the spacing of two threaded bushings provided at the two-wheeler or to the spacing of two screw-on bases that are attached to the two-wheeler and that have internal threads; screwing two screws through the holes into the threaded bushings or into the screw-on bases; displacing the housing of the frame lock relative to the threaded bushings or to the screw-on bases until a desired position of the frame lock relative to the two-wheeler is reached; and tightening the screws to fix the position.

The displacement of the fastening pieces relative to one another may be limited to displacing one of the two fastening pieces. Furthermore, due to the linearly guided displaceable support of the fastening pieces at the housing of the frame lock, the displacement is limited to a displacement along the displacement direction of the respective fastening piece. The displacement of the housing of the frame lock relative to the threaded bushings, in contrast, does not likewise have to be limited to the displacement direction. In particular if the holes formed in the fastening pieces are elongate holes whose longitudinal extent is transverse to the displacement direction, the housing may also be displaced along the respective longitudinal extent of the elongate holes relative to the threaded bushings due to the movability of the screws within the elongate holes. If, instead of threaded bushings provided at the two-wheeler, screw-on bases have been attached to stays of the two-wheeler, said screw-on bases may be displaced in parallel with the course of the stays that is preferably transverse to the displacement direction. Due to a superposition of such displaceabilities with the displaceability along the displacement direction, the housing may advantageously be at least substantially freely positioned within a total two-dimensional areal region before the position is fixed by tightening the screws.

DRAWINGS

The invention will be explained further in the following only by way of example with reference to the Figures.

FIGS. 5 and 6 show one of the fastening pieces of the embodiment shown in FIGS. 1 to 4 of the frame lock in accordance with the invention, separately once in the assembled state (FIG. 5) and once with mutually separate fastening parts from which the fastening piece is formed (FIG. 6);

FIG. 7 shows a band clamp that may be provided in a frame lock in accordance with the invention to provide a fastening possibility for the frame lock to a stay of a two-wheeler;

FIG. 8 shows a section of the embodiment shown in FIGS. 1 to 4 of the frame lock in accordance with the invention that is fastened to a stay of a two-wheeler by means of the band clamp shown in FIG. 7, wherein the region of the fastening is shown in a sectional representation; and FIG. 9 shows the embodiment shown in FIGS. 1 to 4 of the frame lock in accordance with the invention that is fastened to two stays of a two-wheeler by means of two band clamps of the type shown in FIG. 7, in a view obliquely from behind.

DESCRIPTION OF THE INVENTION

The same embodiment of a frame lock 11 in accordance with the invention is shown in each of the Figures, wherein the frame lock 11 is not shown completely in all of the Figures. The frame lock 11 comprises a housing 13 that has a C shape having a parallelepiped-shaped central section and two arcuate limbs extending oppositely to one another out of the central section. With respect to the idealized C shape, the frame lock 11 is mirror-symmetrical with respect to a center plane M (only marked in FIG. 1). Also as regards its actual outer design, the frame lock 11 is at least largely mirror-symmetrical with respect to the center plane M.

Figure 1:
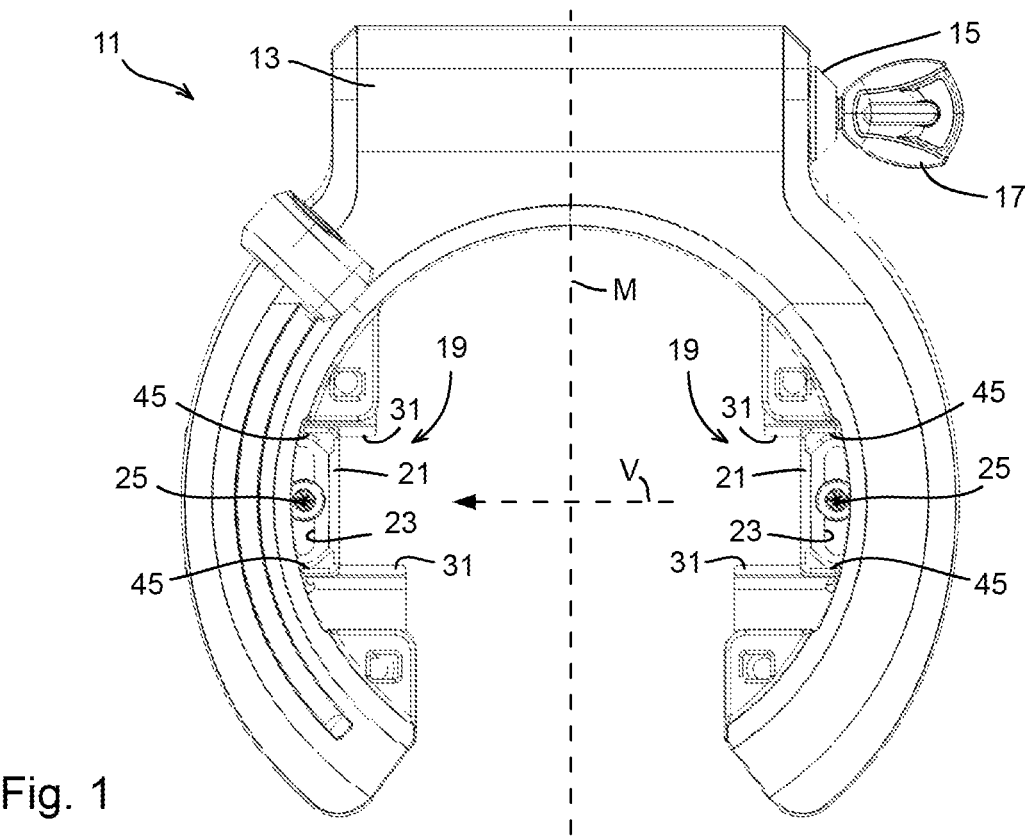
FIGS. 1 and 2 show an embodiment of the frame lock in accordance with the invention, in each case in a view from the front in two different positions of the fastening pieces.
Figure 2:
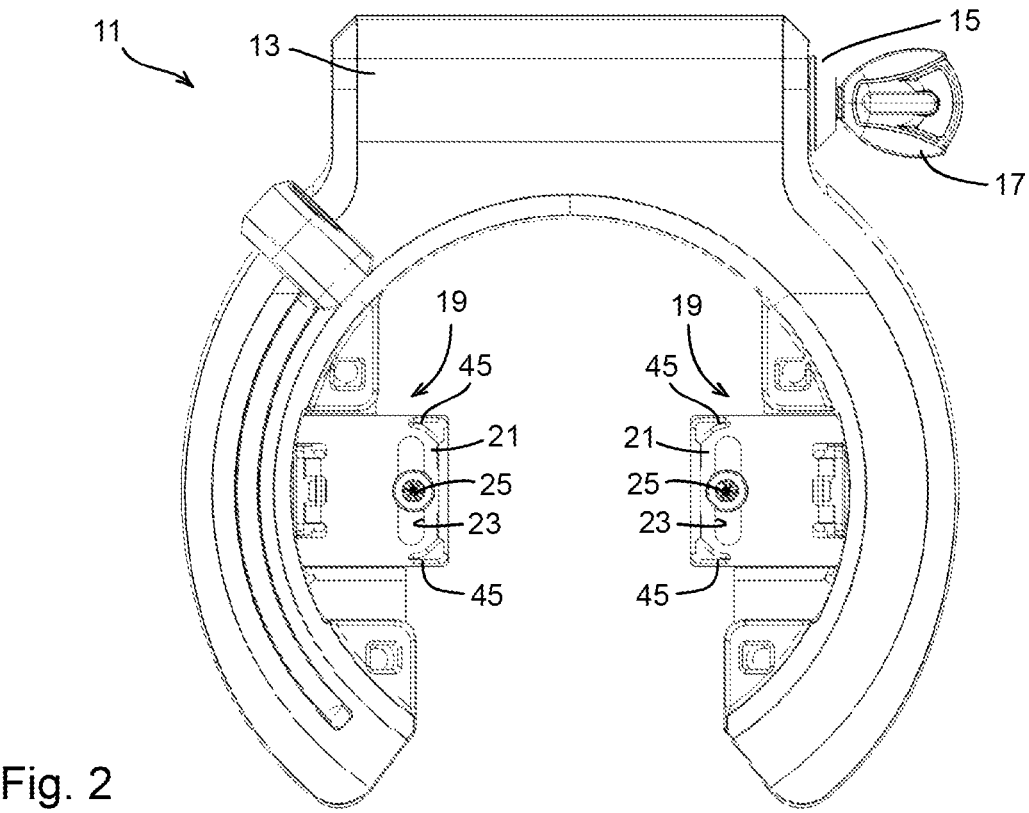

In a hoop receiver, which extends along a circular path through the limb shown at the left in FIGS. 1 and 2 to the central section and, if necessary, beyond it into the other limb, a closing hoop of the frame lock 11 configured as a rotary hoop is received and extends along a circular path. The closing hoop is adjustable along the circular path between an open position, in which it is arranged completely within the hoop receiver of the housing 13, and a closed position, in which it projects out of the housing 13 at the end face of the first limb and extends up to the end face of the second limb or, if necessary, extends through the end face of the second limb into an engagement opening provided there. The open position is shown in each of the Figures.

The frame lock 11 is configured to be fastened to a wheel of a respective two-wheeler such that the housing 13 of the frame lock engages around the tire and rim of the wheel, wherein the limbs of the C shape of the housing 13 are arranged at opposite sides of the wheel. In its closed position, the closing hoop may then engage through the spokes of the wheel to block the wheel against rotation. In the open position, in contrast, the region between the end faces of the limbs of the C shape of the housing 13 remains free such that the wheel may rotate freely.

In the housing 13, a locking apparatus 15 is further received of which only an end section of a lock cylinder included by the locking apparatus 15 can be seen in the Figures, with which end section the locking apparatus 15 projects out of the central section of the housing 13 and into which a key 17 may be introduced to actuate the locking apparatus 15. The predominant part of the locking apparatus 15 is arranged within the housing 13 and in particular comprises a latch that cannot be seen in the Figures, that may be adjusted between an unlocked position and a locked position by means of the key 17, and that is configured to block the closing hoop in its closed position in the locked position such that the frame lock 11 may only be opened by means of the key 17.

To be able to be fastened to the two-wheeler, the frame lock 11 has two fastening sections 19 that, unlike in conventional frame locks, are not formed as an integral part of the housing 13 in the frame lock 11 in accordance with the invention, but as fastening pieces 21 formed separately from the housing 13. In this respect, each of the fastening pieces 21 has a respective hole 23 that is formed as an elongate hole. The frame lock 11 may then be fastened to the two-wheeler by means of screws 25 that are screwed in a screw-in direction, which is perpendicular to the image plane of FIGS. 1 and 2, through the holes 23 at the two-wheeler.

The fastening pieces 21 are arranged in two flange regions of the housing 13 that adjoin the respective limb at the concave side of a respective one of the two limbs of the C shape of the housing 13. The holes 23 formed in the fastening pieces 21 are thereby also arranged in a respective one of the two flange regions.

Figure 3:
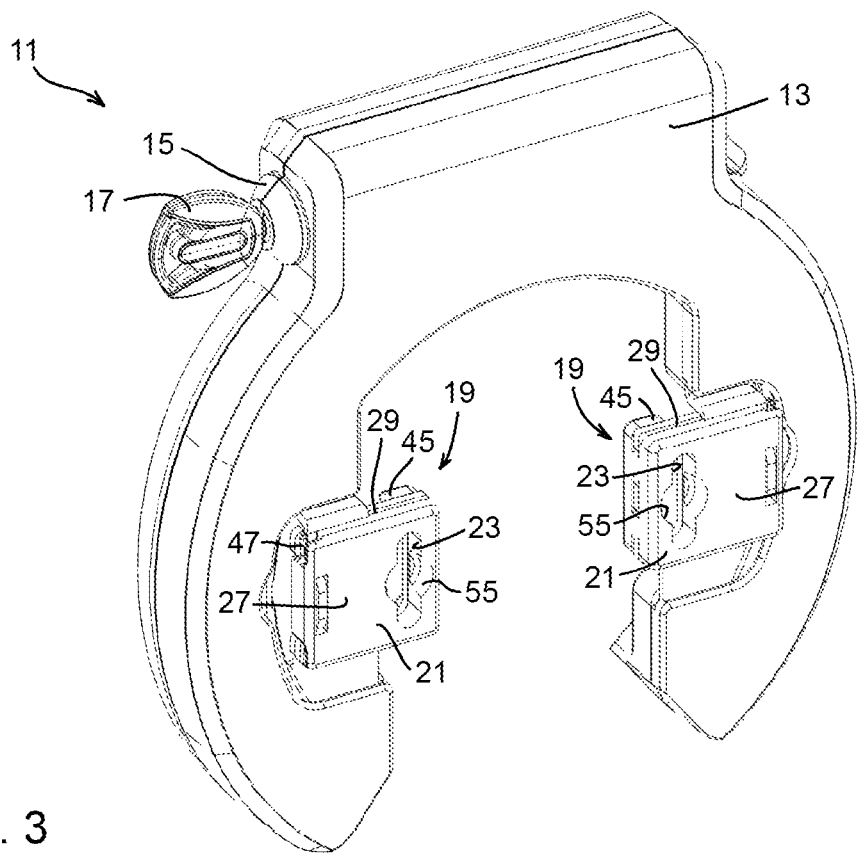
FIGS. 3 and 4 show the same embodiment of the frame lock in accordance with the invention, in each case in a view obliquely from behind in the same two different positions of the fastening pieces as in FIGS. 1 and 2.
Figure 4:
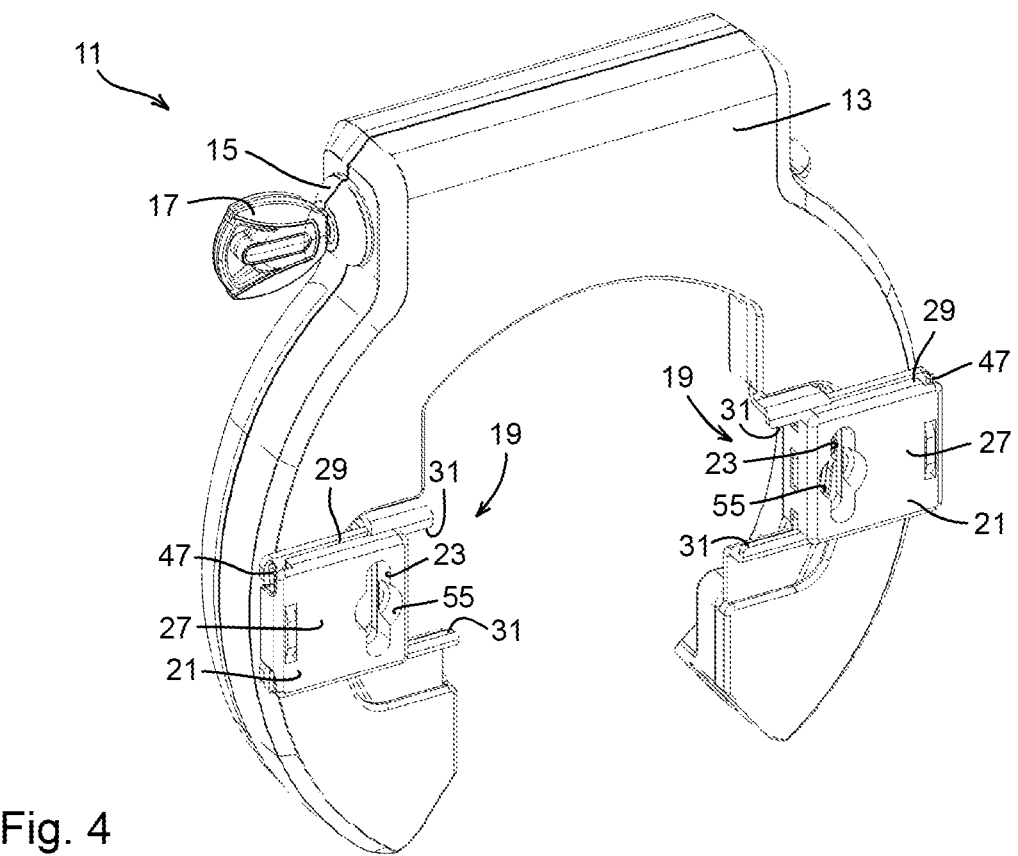

As can in particular be seen in FIGS. 3, 4, and 5, the fastening pieces 21 are each configured as two areal fastening plates that are arranged in parallel with one another. The fastening pieces 21 in particular lie with a respective rear side 27 in a common fastening plane that is in parallel with the image plane of FIGS. 1 and 2.

As a comparison of FIGS. 1 and 2 with FIGS. 3 and 4 shows, the fastening pieces 21 are linearly displaceably supported along a displacement direction V (only marked in FIG. 1), which is in parallel with said fastening plane, relative to the housing 13. The rear sides 27 of the two fastening pieces 21 are thereby always located in the fastening plane irrespective of the respective position of the fastening pieces 21. Furthermore, the fastening pieces 21 are arranged mirror-symmetrically with respect to said center plane M, wherein their displacement direction V is oriented perpendicular to the center plane M such that both fastening pieces 21 are displaceable in parallel with one another along a continuous line.

The fastening pieces 21 may be displaced independently of one another both in the displacement direction V and against the displacement direction V. However, for both fastening pieces 21, the displaceability is in each case limited to a defined path along the displacement direction V. In FIGS. 1 to 4, the fastening pieces 21 are located at a respective end of this defined path, i.e. at a respective end of their respective displaceability. In FIGS. 1 and 3, the fastening pieces 21 are in this respect displaced the furthest away from one another such that they have as large as possible a spacing from one another; in FIGS. 2 and 4, the fastening pieces 21 are, in contrast, displaced the furthest towards one another such that they have as small as possible a spacing from one another.

The holes 23 of the fastening pieces 21 formed as elongate holes are aligned in parallel with one another with respect to their respective longitudinal extent and are furthermore oriented perpendicular to the displacement direction V. In this way, a screw 25 may be movable within a respective hole 23 along a direction perpendicular to the screw-in direction and to the displacement direction V. Conversely, the housing 13 of the frame lock 11 may thereby also be moved relative to the screws 25, which may be screwed in at the two-wheeler, along the direction of the longitudinal extent of the holes 21 and thus perpendicular to the displacement direction V. In parallel with the displacement direction V, the housing 13 of the frame lock 11 may furthermore be moved relative to the screw 25 due to the displaceability of the fastening pieces 21. It results from the superposition of these two movabilities that, after a screwing in of the screws 25 at the two-wheeler, the housing 13, at least as long as the screws 25 have not yet been tightened, may still be substantially freely positioned within a two-dimensional areal region that it is in parallel with the fastening plane and that is spanned by the mutually perpendicular movabilities. By tightening the screws 25, the position of the frame lock 11 may then be fixed to the position that is adopted in this respect.

The displaceability of the fastening pieces 21 results from the type of their support at the housing 13. Each of the two fastening pieces 21, which are of the same construction as one another, in this respect has two grooves 29 that are formed in mutually opposite marginal sides of the respective fastening piece 21 and that have a course in parallel with the displacement direction V and substantially the same length. In each of the two flange regions, two webs 31 configured as sheet metal edges are furthermore provided at the housing 13, project from the housing 13, and are in this respect oriented facing towards one another at least with their respective free ends. The spacing of the two webs 31 from one another in this respect substantially corresponds to the spacing of the two grooves 29 of a respective fastening piece 21 from one another. A respective fastening piece 21 may thereby be inserted between the two webs 31 along the displacement direction V such that a respective one of the webs 31 engages into each of the two grooves 29 of the fastening piece 21. Due this engagement, the fastening piece 21 is supported at the housing 13 and is in this respect displaceable guided relative to the housing 13.

As can in particular be seen in FIGS. 5 and 6, in which only one of the two fastening pieces 21 of the same construction is shown in each case, the fastening pieces 21 are formed in two parts and each comprise a first fastening part 33 and a second fastening part 35. The two fastening parts 33, 35 are configured to be clipped to one another. For this purpose, the second fastening part 35 has a latching receiver 37 in which a latching projection, which cannot be seen in the Figures, is formed that engages behind a latching lug 39 formed at the first fastening part 33 when the latching lug 39 is inserted into the latching receiver 37.

The first fastening part 33 is configured as a punched sheet metal plate, while the second fastening part 35 is manufactured as an injection-molded part composed of plastic. Said rear side 27 of the respective fastening piece 21, which is disposed in the fastening plane and faces in the screw-in direction, is formed at the second fastening part 35 (cf. FIGS. 3 and 4). Both fastening parts 33, 35 each have a hole 41 or 43 that is formed as an elongate hole. In this respect, the holes 41, 43 of the two fastening parts 33, 35 are congruent with respect to the screw-in direction, i.e. they in particular have the same length and the same width and are arranged such that they jointly form the continuous hole 23, formed as an elongate hole, of the respective fastening piece 21 that likewise has the same length and the same width.

The grooves 29 of a respective fastening piece 21 are formed between the two fastening parts 33, 35. The side wall of the groove 29 bounding the respective groove 29 against the screw-in direction is in this respect formed by the first fastening part 33, while the side wall bounding the groove 29 in the screw-in direction is formed by the second fastening part 35. A part of a base of the groove 29 is also formed by the second fastening part 35. In this respect, a free space, however, remains in the base of the groove 29 between the first fastening part 33 and the second fastening part 35. The fastening parts 33, 35 thereby, and due to the manner in which the two fastening parts 33, 35 are connected to one another, have a clearance with respect to one another in the screw-in direction such that the width of the groove 29 (i.e. its extent along the screw-in direction) is variable to a certain extent.

This has the result that the two fastening parts 33, 35 are clamped against one another along the screw-in direction by the tightening of a screw 25 screwed in through the holes 41, 43 of the two fastening parts 33, 35 at the two-wheeler such that the width of the groove 29 is reduced and the respective web 31 engaging into the groove 29 is clamped between the two fastening parts 33, 35 (cf. FIG. 8). The displaceability of the respective fastening piece 21 is thereby canceled in a friction-locked manner and the fastening piece 21 is fixed in its position along the displacement direction V relative to the housing 13. Furthermore, due to the tightening of the screw 25, the position of the screw 25 along the longitudinal extent of the respective hole 23, formed as an elongate hole, of the respective fastening piece 21 is also fixed in a friction-locked manner. Overall, the frame lock 11 may thus be fixed to the position then adopted within said two-dimensional areal region relative to the two-wheeler.

Structures are formed at the second fastening part 35 of a respective fastening piece 21 that act as abutments 45, 47 to limit the displaceability of the fastening piece 21, which is displaceably supported in a guided manner at the housing 13, to a defined path.

Structures of the second fastening part 35, which are provided in the corner regions of the side of the respective fastening piece 21 oriented in the direction toward the respective other fastening piece 21, form two inner abutments 45 with which the respective fastening piece 21 ultimately abuts a respective one of the two limbs of the housing 13 when it is outwardly displaced relative to the housing 13, i.e. in a direction facing away from the central plane M. The respective fastening piece 21 may thereby not be outwardly displaced beyond the position shown in FIGS. 1 and 3.

Furthermore, the second fastening part 35 has further structures that are provided in the corner regions of the side of the respective fastening piece 21 facing away from the respective other fastening piece 21 and that form two outer abutments 47. Both grooves 29 formed at the respective fastening piece 21 are blocked at one of the two ends of their course by a respective one of the outer abutments 47 such that the web 31 engaging into the respective groove 29 ultimately abuts the outer abutment 47 when the respective fastening piece 21 is inwardly displaced relative to the housing 13, i.e. in the direction of the center plane M. In this regard, the outer abutments 47 form blocking sections for the grooves 29. Due to the abutting of the webs 31 at the outer abutments 47, the respective fastening piece 21 may not be inwardly displaced beyond the position shown in FIGS. 2 and 4 (within the scope of the typical use of the frame lock 11).

The outer abutments 47 may be urged laterally out of their position blocking one end of the respective groove 29 such that the web 31 engaging into the groove 29 may be guided past the respective abutment 47. In this way, the fastening pieces 21 may be inserted between the corresponding two webs 31 on the assembly of said fastening pieces 21 at the housing 13. The outer abutments 47 are in this respect advantageously shaped such that they may be urged back comparatively easily into the respective groove 29 when acted on from the outside along the displacement direction V, but may not be urged out of the groove 29 when the respective web 31 is acted on in the opposite direction. For this purpose, a run-on chamfer is formed at the side of the abutments 47 facing away from the respective groove 29.

If no threaded bushings are provided at the two-wheeler, corresponding screw-in possibilities may be retrofitted. For this purpose, the frame lock 11 comprises two band clamps 49 that are shown in FIGS. 7 to 9. Each of the band clamps 49 has a screw-on base 51 that is displaceably arranged at the respective band clamp 49 along its longitudinal extent and that has an internal thread in the manner of a threaded bushing. In the embodiment shown, the internal thread is made to match screws having an ISO metric thread of size M 5.

The band clamps 49 may be tied around a respective back end stay 53 of a two-wheeler. In this respect, as long as they are not yet tightened, they may be displaceable along the course of the respective back end stay 53. In this way, the position of the screw-on base 51 at the respective back end stay 53 may be flexibly fixed.

The screw-on base 51 (at least partly) has the shape of a conical dome. The two fastening pieces 21 each have a receiver 55, said receivers 55 being formed in the rear side 27 of the second fastening part 35 of the respective fastening piece 21. The receivers 55 are in this respect each formed in the region of the hole 23 of the respective fastening piece 21, namely at the center of the longitudinal extent of this hole 23 formed as an elongate hole. The hole 23 is in this respect widened at both sides by the respective receiver 55. The shape of the receivers 55 is complementary to said shape of the screw-on bases 51. The housing 13 of the frame lock 11 may thereby be arranged with the fastening pieces 21 at the band clamps 49, which are fastened to the two-wheeler, such that the screw-on bases 51 are received with an exact fit into the receivers 55 (cf. FIG. 8).

Due to the reception of the screw-on bases 51 into the receivers 55, the movability of the screws 25 within the holes 23, formed as elongate holes, of the two fastening pieces 21 is indeed prevented. However, this is compensated in that the band clamps 49 are movable in parallel with the course of the back end stays 53 as long as they are not yet tightened. Irrespective of whether the screwing in takes place at screw-on bases 51 subsequently attached to the two-wheeler or at threaded bushings anyway provided at the two-wheeler, the frame lock 11 may thus be movable in parallel with the longitudinal extent of the elongate holes before it is finally fixed. In this respect, the displaceability of the two fastening pieces 21 in each case also additionally has the effect that the frame lock 11 is movable along the displacement direction V. As a result, the frame lock 11 in accordance with the invention thus exhibits a particularly flexible positionability that permits a largely free positioning within a two-dimensional areal region.

The invention claimed is:
1. A frame lock for a two-wheeler, said frame lock comprising:
   a housing;
   a locking apparatus that is received in the housing; and
   a closing hoop that is movably supported at the housing between an open position and a closed position and that is selectively blocked in the closed position by means of the locking apparatus,
   wherein the frame lock has two fastening sections having at least one respective hole and is configured to be fastened to the two-wheeler by screwing screws in a screw-in direction through the holes into threaded bushings provided at the two-wheeler,
   wherein each of the two fastening sections is configured as a fastening piece which is formed separately from the housing, in which the respective hole is formed, and which is displaceably supported at the housing linearly guided along a displacement direction;
   wherein the threaded bushings are separate from the fastening sections.
2. The frame lock in accordance with claim 1, wherein the displacement directions of both fastening pieces are at least substantially in parallel with one another.
3. The frame lock in accordance with claim 1, wherein the respective hole is formed as an elongate hole whose longitudinal extent is transverse to the displacement direction of the respective fastening piece.
4. The frame lock in accordance with claim 3, wherein the longitudinal extent of the elongate hole is perpendicular to the displacement direction of the respective fastening piece.
5. The frame lock in accordance with claim 1, wherein abutments are formed at at least one of the housing or the fastening pieces, said abutments limiting the displaceability of the fastening pieces to a defined path along the displacement direction of the respective fastening piece.
6. The frame lock in accordance with claim 1, wherein each of the fastening pieces is configured as an areal fastening plate aligned in parallel with a fastening plane, and wherein the displacement direction of the respective fastening piece is in parallel with the fastening plane.
7. The frame lock in accordance with claim 1, wherein the housing has a C shape or a U shape that is at least substantially mirror-symmetrical with respect to a center plane in parallel with the screw-in direction.
8. The frame lock in accordance with claim 7, wherein the paths along which the two fastening pieces are displaceable are mirror-symmetrical to one another with respect to the center plane.

9. The frame lock in accordance with claim 7, wherein the displacement directions of both fastening pieces are perpendicular to the center plane.

10. The frame lock in accordance claim 1, wherein each of the fastening pieces has one or more grooves aligned in parallel with the displacement direction, and wherein a respective web formed at the housing engages into each of the grooves.

11. The frame lock in accordance claim 10, wherein each of the fastening pieces has two grooves arranged opposite one another.

12. The frame lock in accordance with claim 1, wherein each of the fastening pieces is formed at least in two parts and comprises a first fastening part and a second fastening part that are fixedly connected to one another, and wherein the first fastening part has a hole and the second fastening part has a hole and the holes of the two fastening parts are arranged overlapping with respect to the screw-in direction such that they jointly form the at least one hole of the respective fastening piece.

13. The frame lock in accordance with claim 12, wherein each of the fastening pieces has one or more grooves aligned in parallel with the displacement direction, wherein a respective web formed at the housing engages into each of the grooves, and wherein one or more of the grooves is/are formed between the two fastening parts of the respective fastening piece.

14. The frame lock in accordance with claim 13, wherein the fastening parts of the respective fastening piece have a clearance with respect to one another in the screw-in direction and are configured, when the frame lock is fastened to the two-wheeler, to be clamped against one another along the screw-in direction by the screw screwed through the hole of the fastening piece such that at least one of the webs of the housing engaging into a respective groove of the fastening piece is clamped in the respective groove.

15. The frame lock in accordance with claim 1, wherein, in each of the fastening pieces in its side facing in the screw-in direction, a receiver for receiving a screw-on base having an internal thread is formed, said receiver regionally widening the hole of the respective fastening piece at one side.

16. The frame lock in accordance with claim 15, wherein the frame lock comprises two band clamps that are configured for fastening to a respective stay of the two-wheeler, and wherein each of the band clamps has a screw-on base that is arranged at the respective band clamp, that has an internal thread, and that has a shape complementary to the receivers formed in the fastening pieces.

17. A method of fastening a frame lock in accordance with claim 1 to a two-wheeler comprising the following steps:
- displacing the fastening pieces relative to one another until the spacing of the holes formed in the fastening pieces corresponds to the spacing of two threaded bushings provided at the two-wheeler or to the spacing of two screw-on bases that are attached to the two-wheeler and that have internal threads;
- screwing two screws through the holes into the threaded bushings or into the screw-on bases;
- displacing the housing of the frame lock relative to the threaded bushings or to the screw-on bases until a desired position of the frame lock relative to the two-wheeler is reached; and
- tightening the screws to fix the position.

18. A frame lock for a two-wheeler, said frame lock comprising:
- a housing;
- a locking apparatus that is received in the housing; and
- a closing hoop that is movably supported at the housing between an open position and a closed position and that is selectively blocked in the closed position by means of the locking apparatus,
- wherein the frame lock has two fastening sections having at least one respective hole and is configured to be fastened to the two-wheeler by screwing screws in a screw-in direction through the holes into threaded bushings provided at the two-wheeler,
- wherein each of the two fastening sections is configured as a fastening piece which is formed separately from the housing, in which the respective hole is formed, and which is displaceably supported at the housing linearly guided along a displacement direction;
- wherein the displacement direction is perpendicular to the screw-in direction or differs from an orientation perpendicular to the screw-in direction by an angle of at most 15 degrees.

* * * * *